US012591685B2

(12) United States Patent
Whitcomb et al.

(10) Patent No.: US 12,591,685 B2
(45) Date of Patent: Mar. 31, 2026

(54) RISK ASSESSMENT BASED DATA ACCESS

(71) Applicant: MX Technologies, Inc., Lehi, UT (US)

(72) Inventors: David Whitcomb, Crozet, VA (US);
Daniel D. Jones, Eagle Mountain, UT
(US); Brian Fromm, Lehi, UT (US)

(73) Assignee: MX TECHNOLOGIES, INC., Lehi,
UT (US)

( * ) Notice: Subject to any disclaimer, the term of this
patent is extended or adjusted under 35
U.S.C. 154(b) by 264 days.

(21) Appl. No.: 17/735,089

(22) Filed: May 2, 2022

(65) Prior Publication Data

US 2022/0350896 A1 Nov. 3, 2022

Related U.S. Application Data

(60) Provisional application No. 63/182,755, filed on Apr.
30, 2021.

(51) Int. Cl.
*H04L 9/08* (2006.01)
*G06F 21/57* (2013.01)
*H04L 9/32* (2006.01)

(52) U.S. Cl.
CPC ...... *G06F 21/577* (2013.01); *G06F 2221/033*
(2013.01)

(58) Field of Classification Search
CPC .......................... G06F 21/577; G06F 2221/033
USPC .......................................................... 726/25
See application file for complete search history.

(56) References Cited

U.S. PATENT DOCUMENTS 10,341,374 B1 * 7/2019 Sadaghiani ........... G06F 18/217
10,997,608 B1 * 5/2021 Veeraraghavan ....... G06F 9/541

| | | | |
|---|---|---|---|
| 11,126,746 B2 * | 9/2021 | Dunjic | G06F 21/6245 |
| 11,558,412 B1 * | 1/2023 | Drake | G06F 3/0484 |
| 11,605,093 B1 * | 3/2023 | Cervantez | G06Q 30/0185 |
| 11,606,689 B1 * | 3/2023 | Mhaske | H04W 12/068 |
| 11,625,689 B2 * | 4/2023 | Irimie | H04L 63/1433 705/321 |
| 11,736,489 B2 * | 8/2023 | Borkar | G06F 9/44526 |
| 11,757,924 B2 * | 9/2023 | Vlahovic | G06Q 10/0635 |
| 2007/0094260 A1 | 4/2007 | Murphy et al. | |
| 2010/0077445 A1 | 3/2010 | Schneider et al. | |
| 2015/0213449 A1 * | 7/2015 | Morrison | G06Q 20/4016 705/44 |
| 2015/0350174 A1 * | 12/2015 | Reno | H04L 63/1433 726/25 |
| 2017/0041296 A1 * | 2/2017 | Ford | G06F 21/64 |
| 2017/0230402 A1 * | 8/2017 | Greenspan | H04W 12/08 |
| 2019/0116172 A1 | 4/2019 | Caldwell | |

(Continued)

FOREIGN PATENT DOCUMENTS

JP        2015-138509        7/2015

*Primary Examiner* — Sharon S Lynch
*Assistant Examiner* — Pegah Barzegar
(74) *Attorney, Agent, or Firm* — KNH LLP

(57) ABSTRACT

Apparatuses, methods, computer program products, and
systems are disclosed for risk assessment based data access.
A method includes determining security risks for each of a
plurality of executable applications accessing an application
programming interface. A method includes monitoring
changes in the security risks for each of the plurality of
executable applications. A method includes dynamically
adjusting a scope of permissions for the plurality of execut-
able applications with regard to the application program-
ming interface based on the monitored changes in the
security risks.

20 Claims, 7 Drawing Sheets

(56) References Cited

U.S. PATENT DOCUMENTS

| | | | | |
|---|---|---|---|---|
| 2019/0349393 | A1* | 11/2019 | Nunes | H04L 63/1425 |
| 2020/0162485 | A1* | 5/2020 | Jevans | H04L 63/0428 |
| 2020/0265357 | A1* | 8/2020 | Vashistha | G06Q 10/08 |
| 2020/0274900 | A1* | 8/2020 | Vaishnavi | H04L 63/20 |
| 2020/0336508 | A1* | 10/2020 | Srivastava | H04L 63/20 |
| 2021/0152555 | A1* | 5/2021 | Djosic | G06N 20/00 |
| 2021/0168166 | A1* | 6/2021 | Liu | G06N 20/20 |
| 2022/0191234 | A1* | 6/2022 | Fox | G06N 20/00 |
| 2022/0337631 | A1* | 10/2022 | Bhattacharya | H04L 63/0245 |
| 2022/0350877 | A1* | 11/2022 | Whitcomb | G06F 21/445 |
| 2022/0350896 | A1* | 11/2022 | Whitcomb | G06F 21/577 |
| 2022/0351204 | A1* | 11/2022 | Whitcomb | G06Q 20/401 |
| 2024/0134989 | A1* | 4/2024 | Veluthakkal | G06F 21/575 |

* cited by examiner

500

Start

502   Determine Security Risks

504   Monitor Changes in Security Risks

506   Adjust Scope of Permissions

End

600

RISK ASSESSMENT BASED DATA ACCESS

CROSS-REFERENCES TO RELATED APPLICATIONS

This application claims the benefit of U.S. Provisional Patent Application No. 63/182,755 entitled "RISK ASSESSMENT BASED DATA ACCESS" and filed on Apr. 30, 2021, for David Whitcomb, et al., which is incorporated herein by reference in its entirety for all purposes.

FIELD

This invention relates to security risk assessments and more particularly relates to data access based on security risk assessments.

BACKGROUND

Providing data to third parties inherently involves security risks. However, access to most data is typically all or nothing, with little or no flexibility, especially if security risks change over time.

BRIEF SUMMARY

Apparatuses, methods, computer program products, and systems are disclosed for risk assessment based data access. In one embodiment, an apparatus includes a processor and a memory that stores code executable by the processor. Executable code, in some embodiments, is configured to authenticate a user into a first environment associated with a first core processing system with first electronic credentials for the user. In certain embodiments, executable code is configured to display a user interface element to the user within the first environment. Executable code, in a further embodiment, is configured to authenticate the user into a second core processing system in response to user input to the user interface element. Executable code, in one embodiment, is configured to migrate a first account for the user with the first core processing system to a different account for the user with the second core processing system in response to the user input to the user interface element.

In some embodiments, a method for risk assessment based data access includes authenticating a user into a first environment associated with a first core processing system with first electronic credentials for the user. A method, in one embodiment, includes displaying a user interface element to the user within the first environment. A method, in certain embodiments, includes authenticating the user into a second core processing system in response to user input to the user interface element. A method, in a further embodiment, includes migrating a first account for the user with the first core processing system to a different account for the user with the second core processing system in response to the user input to the user interface element.

In one embodiment, an apparatus for risk assessment based data access includes means for authenticating a user into a first environment associated with a first core processing system with first electronic credentials for the user. An apparatus, in some embodiments, includes means for displaying a user interface element to the user within the first environment. An apparatus, in certain embodiments, includes means for authenticating the user into a second core processing system in response to user input to the user interface element. An apparatus, in a further embodiment, includes means for migrating a first account for the user with the first core processing system to a different account for the user with the second core processing system in response to the user input to the user interface element.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
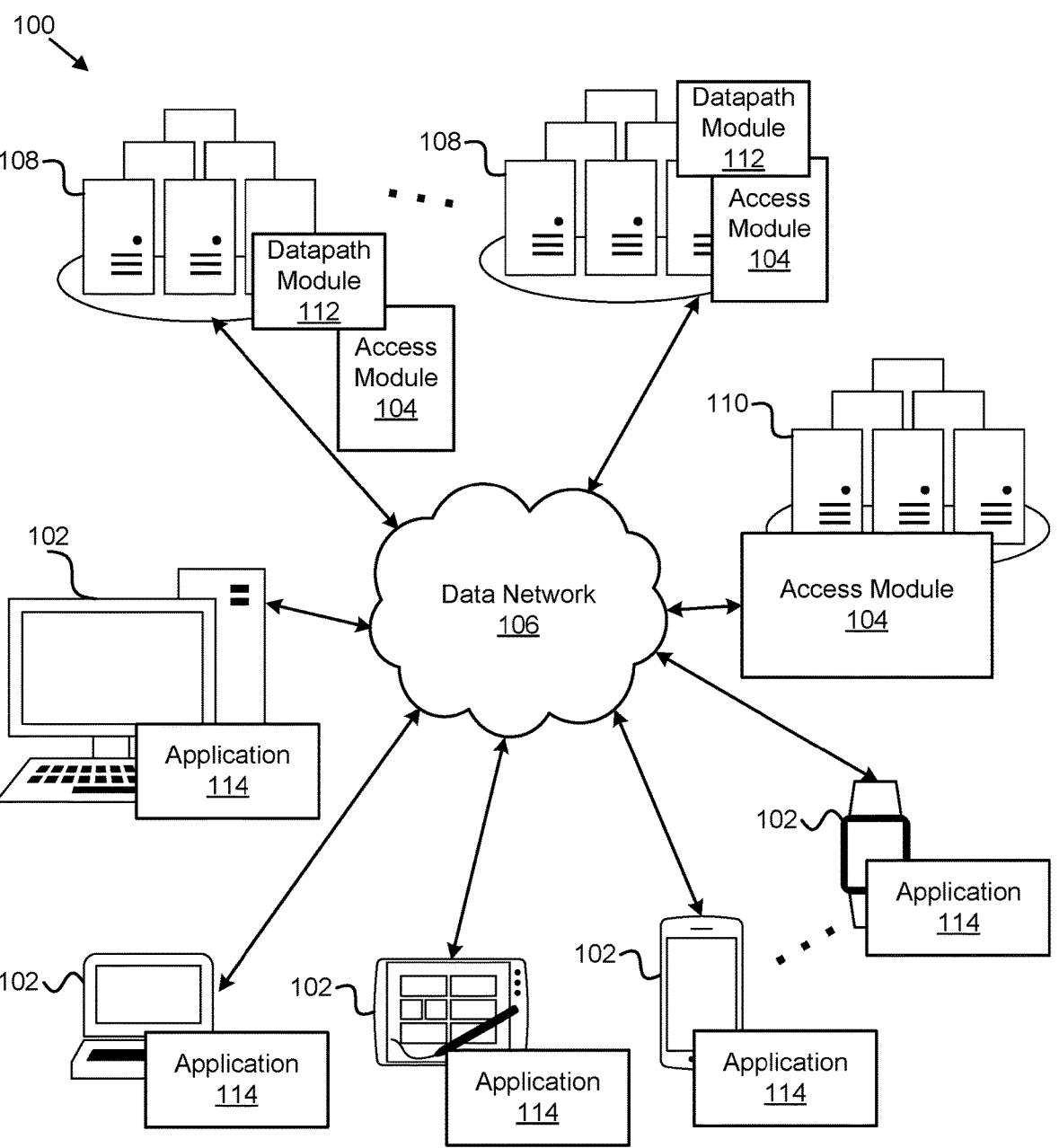
FIG. 1A is a schematic block diagram illustrating one embodiment of a system for risk assessment based data access.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1B:
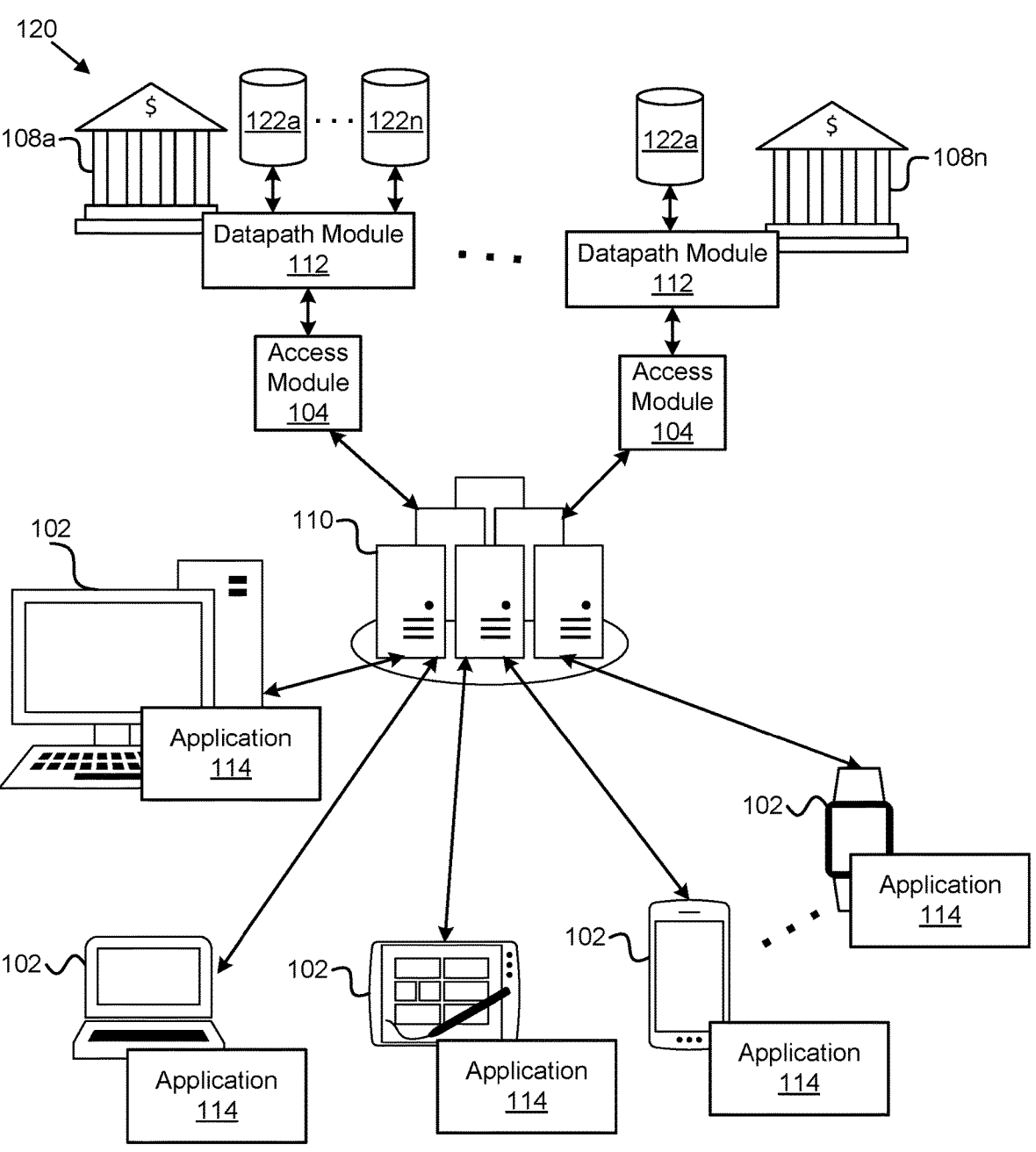
FIG. 1B is a schematic block diagram illustrating one embodiment of a system for risk assessment based data access.

FIG. 1A and FIG. 1B depict embodiments of systems 100, 120 for risk assessment based data access. In one embodiment, the system 100 includes one or more hardware computing devices 102, one or more access modules 104 (e.g., a backend access module 104 disposed on a backend server 110, and/or a plurality of access modules 104 disposed on servers 108 of one or more third-party service providers 108, or the like), one or more data networks 106 or other communication channels, one or more third-party service providers 108 (e.g., one or more servers 108 of one or more service providers 108; one or more cloud or network service providers 108, or the like), one or more backend servers 110 and/or one or more core processing systems 122a-n. In certain embodiments, even though a specific number of hardware computing devices 102, access modules 104, data networks 106, third-party service providers 108, backend servers 110, and/or core processing systems 122a-n are depicted in FIG. 1A and FIG. 1B, one of skill in the art will recognize, in light of this disclosure, that any number of hardware computing devices 102, access modules 104, data networks 106, third-party service providers 108, backend servers 110, and/or core processing systems 122a-n may be included in the systems 100, 120.

In general, a datapath module 112 provides electronic access and/or another connection to data, such as data from one or more core processing systems 122a-n, or the like, to an access module 104, to one or more executable applications 114, to a backend server 110, over a data network 106, or the like. A core processing system 122, as used herein, comprises one or more hardware computing devices and/or computer executable program code for storing, tracking, processing, and/or updating transaction data, account data, other data, or the like for one or more users. For example, in embodiments where a third-party service provider 108 comprises a bank or other financial institution, a core processing system may comprise a backend system that processes financial transactions, posts updates to financial accounts (e.g., deposit accounts such as savings and/or checking accounts, loan or other credit accounts, investment accounts, mortgage accounts, credit card accounts, or the like), and/or provides other general ledger or financial reporting functions. Core processing systems 122a-n may have different compatibilities, functions, requirements, or the like and may be installed on premises, may be cloud-based and installed on a backend server 110, may be accessible over a data network 106, or the like. A datapath module 112 may connect one or more core processing systems 122a-n to an access module 104 and/or to one or more other interfaces or services.

In one embodiment, a datapath module 112 may be configured to simultaneously support multiple account/transaction core processing systems 122a-n, providing a user (e.g., a financial institution, a third-party entity, or the like) with real-time access to each account/transaction core processing system 122 through the same endpoint (e.g., an access module 104 or other application programming interface) or other interface, even if different identifiers, different tokens or other electronic credentials, or the like may be used for the same user for the different cores 122a-n on the backend for the datapath module 112 to access the different cores 122a-n. In one embodiment, the datapath module 112 maintains simultaneous access to the different core processing systems 122a-n overtime, on an ongoing basis. In a further embodiment, the datapath module 112 automatically migrates users from a first account/transaction core processing system 122 to a second (e.g., different) account/transaction core processing system 122 over time.

For example, a datapath module 112 may support multiple different account/transaction core processing systems 122a-n on the same backend for the same set of users, providing access to the multiple different account/transaction core processing systems 122a-n through the same endpoint (e.g., the same access module 104, the same API, the same online portal, the same mobile and/or desktop application 114, another user interface, or the like). For example, in some embodiments, a datapath module 112 may enable a financial institution or other entity 108 to use different core processing systems 122a-n for checking/savings accounts than for credit cards, than for mortgages, or the like on an ongoing basis, without immediately or necessarily migrating between the cores 122a-n, or to seamlessly continue to support multiple account/transaction core processing systems 122a-n after a merger, or the like.

Because user and/or account identifiers may be different for the different account/transaction core processing systems 122a-n, a datapath module 112, in some embodiments, may maintain an identity repository or other data structure mapping user and/or account identifiers between account/transaction core processing systems 122a-n. Similarly, a datapath module 112 may maintain separate electronic credentials (e.g., authorization tokens, usernames and passwords, or the like) for each user and/or account for the different account/transaction core processing systems 122a-n, but may provide a single point of validation and/or authentication for the user to access the multiple account/transaction core processing systems 122a-n (e.g., using the separate authorization tokens or other electronic credentials once the user has been authenticated, or the like). For example, during registration, an initial login, or the like for a user, a datapath module 112 may query multiple account/transaction core processing systems 122a-n to determine if the user has an account, and may populate the identity repository with the resulting identifiers for the user, for the accounts, or for other account information.

In some embodiments, a datapath module 112 automatically migrates user accounts between different core account processing systems 122a-n. A datapath module 112, in certain embodiments, may migrate accounts in a user-led manner, delaying migration of a user's account until the user logs in to a new environment, or otherwise provides user input to a user input element, or the like. A datapath module 112, in response to determining to migrate an account between core account processing systems 122a-n, may close an account on a first core processing system 122, create a new account on a second core processing system 122, and transfer funds from the closed account to the new account, or the like. In this manner, by waiting for a user to login or otherwise interact with a displayed user interface element before migrating, migration may be throttled or spread out over time, and the user may be allowed to opt-in to the migration, allowing early adopters or more frequent users to be migrated first. A datapath module 112, in this manner, may also help the migrating financial institution 108a-n to satisfy certain contractual obligations, by migrating the most active users first, or the like. A datapath module 112, in certain embodiments, provides a seamless migration between core account processing systems 122a-n over time, as users self-select for migration.

In general, an access module 104 is configured to manage third party access (e.g., executable applications 114 or other third party clients) to data (e.g., user data, financial account and/or transaction data, an API, or the like) dynamically based on a live risk assessment of the third party (e.g., a developer, owner, vendor, retailer, publisher, and/or other entity associated with an executable application 114). For example, an access module 104 may determine a risk assessment for a third party executable application 114 (e.g., a data recipient 114) based on security or other risk submissions by the third party 114, monitoring a set of steps taken by the third party 114 (e.g., registration steps, training steps, sandbox steps, or the like), live monitoring of third-party sources (e.g., the dark web, online articles, government filings, lawsuits, or the like), and/or other security and/or risk factors.

In certain embodiments, an access module 104 may determine a scope of third-party access to data based on the current dynamic risk assessment for the third party executable application 114 (e.g., dynamically expanding or restricting access based on changes in the risk assessment). For example, in response to an increase in determined risk for a third-party executable application 114, an access module 104 may limit a number of requests the third-party executable application 114 may make to an access module 104 or other API during a predefined time period, may limit a number of users for which the third-party executable application 114 may make requests to an access module 104 or other API, may limit data elements or data types available to the third-party executable application 114 over the access module 104 or other API, may block access to the access module 104 or other API completely to the third-party executable application 114, or the like. As the risk determined for the third-party executable application 114 decreases, an access module 104 may dynamically increase a scope of access permissions, or the like.

An access module 104, in some embodiments, may dynamically notify a third-party (e.g., a developer, owner, vendor, retailer, publisher, administrator, and/or other entity associated with an executable application 114) of updates to the third-party executable application 114's risk assessment, of changes in data access for the third-party executable application 114, or the like. In certain embodiments, an access module 104 may provide a portal, dashboard, and/or other graphical user interface to a data provider 108a-n, displaying dynamic risk assessments determined for a plurality of data recipients 114 such as executable applications 114 and/or associated third party entities (e.g., allowing the data provider 108a-n to set risk thresholds, manually adjust data access, view changes in risk assessments and/or scopes of data access, or the like).

In one embodiment, a system 100, 120 includes one or more hardware computing devices 102. The hardware computing devices 102 (e.g., hardware computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware computing devices 102 are in communication with one or more servers 108 of one or more third-party service providers 108 and/or one or more backend servers 110 via a data network 106, described below. The hardware computing devices 102, in a further embodiment, are capable of executing various programs 114, program code 114, applications 114, instructions 114, functions 114, or the like.

In one embodiment, an access module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party service providers 108, for one or more core processing systems 122a-n, for an application 114, for an access module 104, or the like. The access module 104, in certain embodiments, accesses a server 108 of a third-party service provider 108, a core processing system 122a-n, or the like using a user's electronic credentials to download data associated with the user, such as a user's photos, a user's social media posts, a user's medical records, a user's financial transaction records or other financial data, and/or other data associated with and/or owned by a user but stored by a server 108 and/or core processing system 122*a-n* of a third-party service provider 108 (e.g., stored by hardware not owned, maintained, and/or controlled by the user). The access module 104, in various embodiments, may provide the downloaded data to the user locally (e.g., displaying the data from an application 114 to an electronic display screen of a hardware computing device 102); may provide the downloaded data from the hardware computing device 102 of the user to and/or package the data for an intermediary 110 or other remote server 110 (e.g., a backend access module 104) or other remote device (e.g., another hardware computing device 102 of the user, a hardware computing device 102 of a different user, or the like) which may be unaffiliated with the third-party service provider 108; may provide one or more alerts, messages, advertisements, or other communications to the user (e.g., from an application 114 on a hardware computing device 102) based on the downloaded data; or the like.

In certain embodiments, the system 100, 120 includes a plurality of access modules 104 disposed, located, and/or in communication with different third-party service providers 108*a-n*, each in communication with one or more intermediaries 110 or other hardware server computing devices 110 which may communicate data from the access modules 104 to users via the applications 114 and/or other data recipients 114. The plurality of access modules 104 may execute across multiple hardware computing devices, may be geographically dispersed and using different IP addresses, and/or may download and/or aggregating data (e.g., photos, social media posts, medical records, financial transaction records, other financial data, and/or other user data) separately for different third-party service providers 108 (e.g., a financial institution, bank, credit union, and/or other online banking provider; a social media site; a medical provider; a photo hosting site; or the like).

In one embodiment, at least a portion of an access module 104 may be integrated with or otherwise part of another application executing on a hardware computing device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the access module 104 downloads from a server 108 of a third-party service provider 108.

The one or more access modules 104, in certain embodiments, may provide an interface (e.g., an application programming interface (API), a graphical user interface of an application 114, or the like) to provide downloaded and/or aggregated user data from servers 108, core processing systems 122*a-n*, or the like of one or more third-party service providers 108 to one or more other entities (e.g., an application 114 or other data recipient entity, a remote server 110 or other hardware computing device 102 unaffiliated with the third-party service provider 108, or the like). The interface, in one embodiment, comprises a private interface between applications 114 executing on users' hardware computing devices 102 and one or more access modules 104. In another embodiment, the interface comprises a public and/or open interface, which may be secured, allowing a user to share the user's downloaded data from an access module 104 to one or more other tools, services, and/or other entities to store, process, and/or otherwise use the data.

In various embodiments, an access module 104 and/or a datapath module 112 may be embodied as hardware, software, or some combination of hardware and software. In one embodiment, an access module 104 and/or a datapath module 112 may comprise executable program code stored on a non-transitory computer readable storage medium for execution on a processor of a hardware server computing device 108, 110, or the like. For example, an access module 104 and/or a datapath module 112 may be embodied as executable program code executing on one or more of a hardware computing device 102, a hardware server computing device 108, 110, a combination of one or more of the foregoing, or the like. In such an embodiment, the various modules that perform the operations of an access module 104 and/or a datapath module 112, as described below, may be located on a hardware computing device 102, a hardware server computing device 108, 110, a combination thereof, or the like.

In various embodiments, an access module 104 and/or a datapath module 112 may be embodied as a hardware appliance that can be installed or deployed on a backend server 108, 110, on a user's hardware computing device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a server 108, 110 and/or a user's hardware computing device 102. In certain embodiments, an access module 104 and/or a datapath module 112 may comprise a hardware computing device such as a secure hardware dongle or other hardware appliance device (e.g., a set-top box, a network appliance, or the like) that attaches to another hardware computing device 102, 108, 110, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an access module 104 and/or of a datapath module 112 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an access module 104 and/or a datapath module 112.

An access module 104 and/or a datapath module 112, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an access module 104 and/or a datapath module 112 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an access module 104 and/or a datapath module 112.

The semiconductor integrated circuit device or other hardware appliance of an access module 104 and/or a datapath module 112, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an access module 104 and/or a datapath module 112 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more core processing systems 122*a-n*, one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social media site, a photo sharing site, a video sharing site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more backend servers 110 and/or one or more backend access modules 104 provide central management of networked access modules 104 and/or datapath modules 112. For example, the one or more backend access modules 104 and/or a backend server 110 may store downloaded user data from the access modules 104 and/or datapath modules 112 centrally, may provide instructions for the access modules 104 and/or datapath modules 112 to access user data from one or more third-party service providers 108 using tokens or other electronic user credentials, or the like. A backend server 110 may include one or more servers located remotely from the hardware computing devices 102 and/or the one or more third-party service providers 108. A backend server 110 may include at least a portion of the modules or sub-modules described below with regard to the access modules 104 of FIG. 2 and FIG. 3, may comprise hardware of an access module 104 and/or a datapath module 112, may store executable program code of an access module 104 and/or a datapath module 112 in one or more non-transitory computer readable storage media, and/or may otherwise perform one or more of the various operations of an access module 104 and/or a datapath module 112 described herein.

In certain embodiments, an access module 104 may be configured to provide an interface (e.g., a GUI, a CLI, an API, one or more web pages, a web-enabled application, or the like) to a user through a hardware computing device 102, allowing the user to manage multiple aggregators of the user's data (e.g., multiple different types of applications 114 or other data recipients 114, and/or other entities), manage aggregation and/or data access permissions, or the like.

An access module 104 may display, to a user, a listing of multiple entities (e.g., multiple different types of applications 114 or other data recipients 114, third-party service providers 108, or the like) the user has authorized to download and/or aggregate the user's data (e.g., as clients of the backend server 110, or the like), what data the user has authorized the entities (e.g., applications 114, third-party service providers 108, or the like) to download and/or aggregate, or the like. For example, in one embodiment, several third-party service providers 108 may comprise financial institutions or the like with different applications 114, the user may have authorized an application 114 from one third-party service provider 108 to aggregate data from one different financial institution (e.g., a different third-party service provider 108), and authorized an application 114 from another third-party service provider 108 to aggregate data from two or more other financial institutions (e.g. other third-party service providers 108), and an access module 104 may display each of the authorizations to the user, in a graphical user interface (GUI) or the like.

An access module 104 may provide an interface (e.g., a GUI) for a user to revoke and/or add an authorization for an application 114 or other entity to aggregate the user's data (e.g., from a different one or more third-party service providers 108, or the like. An access module 104, in certain embodiments, may display, to a user, (e.g., in a GUI) whether the user's electronic credentials, provided to an application 114, a third-party service provider 108, or other entity for aggregating the user's data or the like, are valid and/or up to date (e.g., by comparing the user's electronic credentials from the access module 104 to electronic credentials provided to an application 114, a third-party service provider 108, or other entity; based on an error message from a third-party service provider 108 or other entity; by attempting to log into a third-party service provider 108 using the electronic credentials; or the like). In one embodiment, an access module 104 may provide an interface for a user to update and/or correct electronic credentials provided to an application 114, to one or more third-party service providers 108, or the like for aggregating the user's data and may provide the updated electronic credentials to the application 114, the third-party service provider 108, or other entity, may download or otherwise aggregate data for the user using the updated electronic credentials on behalf of the application 114, the third-party service provider 108 or other entity, or the like.

In this manner, in certain embodiments, an access module 104 may allow a user to see how many different entities (e.g., applications 114, third-party service providers 108, or the like) have access to one or more of the user's accounts, which entities (e.g., applications 114, third-party service providers 108, or the like) have valid and/or up to date electronic credentials, selectively update electronic credentials for one or more entities (e.g., applications 114, third-party service providers 108, or the like), revoke/cancel authorization for an entity (e.g., an application 114, a third-party service provider 108, or the like) to access one or more of the user's accounts (e.g., to download and/or aggregate data from an account for the user), or the like, in a single location, using a single portal or tool. In one embodiment, an access module 104 may comprise an interface (e.g., an API or the like) with one or more different access modules 104 or the like (e.g., associated with different backend servers 110, different third-party service providers 108, or the like), allowing the access module 104 to provide an interface for a user to manage aggregation and/or authorizations for the one or more different access modules 104 as well.

In response to an application 114 requesting access to at least a portion of a user's data downloaded and/or stored by an access module 104, an access module 104 may display, to a user (e.g., as a pop-up window or other user interface element, in a GUI or the like) an interface for granting, denying, and/or altering the third-party service provider 108's request. In certain embodiments, an access module 104 may provide a user with fine grained controls over access to data downloaded and/or stored by an access module 104. For example, in one embodiment, an access module 104 may allow a user to individually grant, revoke, and/or adjust access permissions for data from different third-party service providers 108 to applications 114 and/or to other third-party service providers 108, for different data elements from certain third-party service providers 108 (e.g., certain columns, certain rows, account numbers, transactions, amounts, descriptions, interest rates, photos, posts, likes, friends, and/or other distinguishable data elements), for different data types, or the like.

In this manner, in some embodiments, an access module 104 may provide an interface (e.g., a GUI) for a user to grant and/or deny access rights for an application 114 or other data recipient 114 to access an interest rate from a mortgage lender third-party service provider 108 but not a loan amount, to access names of parties to a transaction (e.g., merchant and/or vendor names) but not transaction amounts from a bank account with a different third-party service provider 108, and may grant another application 114 or other data recipient 114 access rights to all of the user's aggregated data, or the like. In some embodiments, an access module 104 may allow a user to allow/grant, deny, and/or revoke access of one or more applications 114 to data downloaded from one or more third-party service providers 108.

An access module 104, in certain embodiments, may comprise a central, trusted intermediary or other entity, through which a user may manage all permissions for the user's data downloaded and/or aggregated from one or more third-party service providers 108 (e.g., on behalf of the user for one or more applications 114 or other data recipients 114), allowing the user to dynamically manage and adjust (e.g., using a GUI), which applications 114 or other data recipients 114 have access to which portions of data aggregated from which other third-party service providers 108.

In one embodiment, an access module 104 blocks a third-party service provider 108 from accessing or even verifying the existence of data for which a user has not granted the third-party service provider 108 access. An access module 104, in some embodiments, may provide an interface for a user to update a username, electronic credentials, security questions, and/or other security settings for multiple third-party service providers 108, through a single, central, trusted location (e.g., in a GUI or the like from an access module 104). As described below with regard to the password manager module 306, in certain embodiments, a datapath module 112 and/or an access module 104 (e.g., in cooperation with the password manager module 306) may manage and/or set electronic credentials for a plurality of third-party service providers 108 for a user (e.g., so that the user does not have to know and/or remember multiple passwords, in order to generate more secure electronic credentials, or the like).

An access module 104, in certain embodiments, may monitor electronic credentials of users (e.g., comparing usernames used with the same third-party service provider 108, or the like) used to download and/or aggregate the users' data (e.g., in order to optimize the downloading of data, avoid and/or minimize the repeated download of the same data, or the like). For example, an access module 104 may detect similar electronic credentials (e.g., the same username, such as an email address or other unique username) of a user for the same third-party service provider 108 being used to download data for multiple other third-party service providers 108 (e.g., the multiple other third-party service providers 108 may each be clients of the backend server 110 and may have each requested aggregation of the same data for the same user from the user's account with the same third-party service provider 108, or the like). In one embodiment, an access module 104 may provide an interface (e.g., a GUI) where a user may provide electronic credentials for a third-party service provider 108, and an access module 104 may determine whether the electronic credentials are being used by any other third-party service providers 108 to download and/or aggregate data from the third-party service provider 108, or the like.

An access module 104, in some embodiments, may determine that electronic credentials are similar if a username (e.g., a unique identifier, an email address, or the like) is the same (e.g., identical) even if the associated passwords, fingerprints, face identifiers, or other electronic credentials are different. For example, there may be different passwords associated with the same account, different third-party service providers 108 may be using passwords for the same account from different time periods (e.g., an old and/or expired password), or the like, but the accounts may be the same if the usernames are the same.

If the same data for the same user is downloaded or otherwise accessed from the same third-party service provider 108 multiple times, from different hardware computing devices 102, 110 or the like, during different sessions with different session identities (e.g., internet protocol (IP)

addresses, user agent strings, browser cookies, or the like) the third-party service provider 108 may require repeated verification (e.g., multiple one-time passwords, repeated multifactor authentication, or the like), may logout or block certain downloads, or the like. An access module 104, in certain embodiments, in response to detecting that the same account is being accessed for multiple third-party service providers 108 (e.g., detecting a similar username or other electronic credential is being used), may share the same data (e.g., downloaded by the same hardware computing device 102, 110 from the same third-party service provider 108 with the same or similar electronic credentials using a same session identity, or the like) with each of the multiple third-party service providers 108 requesting the data, instead of downloading the data repeatedly.

A session identity, in one embodiment, may include an internet protocol (IP) address to which data is downloaded (e.g., an IP address of a physical and/or virtual computing device 102, 110 downloading the data). A session identity, in a further embodiment, includes a user agent string (e.g., provided to the third-party service provider 108 from a physical and/or virtual computing device 102, 110 downloading the data). A user agent string may identify a browser, an operating system, a hardware computing device, a client identity, a client version, a rendering engine, a compatibility, and/or other identity information for a session identity. A session identity, in some embodiments, includes one or more browser cookies (e.g., metadata from a third-party service provider 110 stored on the hardware computing device 102, 110 downloading the data, such as a hypertext transfer protocol (HTTP) cookie, a web cookie, an internet cookie, an authentication cookie, a session cookie, a persistent cookie, a third-party tracking cookie, or the like).

By using and/or maintaining one or more of the same IP address, user agent string, browser cookies, or the like to download data for a user from a third-party service provider 110, even if the data is being downloaded for multiple other third-party service providers 110, in certain embodiments, an access module 104 may reduce the authentication overhead of downloading the data, may reduce the load on the third-party service provider 110, may provide more consistent data to the user (e.g., accessing the same aggregated data through the multiple other third-party service providers 110), and/or may reduce a chance that the third-party service provider 110 will block access to the user's data.

In some embodiments, even if one or more access modules 104 are downloading the data at different times and/or from different hardware computing devices 102, 110, an access module 104 may use the same session identity (e.g., copying, cloning, and/or spoofing an IP address, a user agent string, a browser, an operating system, a hardware computing device, a cookie, or the like to maintain the same session identity) over time to download data from the same third-party service provider 108. An access module 104, in certain embodiments, may even maintain the same session identity for downloading data from a third-party service provider 108 when one of multiple third-party service providers 108 sharing the data removes the user (e.g., stops and/or ceases using the data, requesting the data or the like; requests that the access module 104 deletes and/or removes the user; or the like). In this manner, in response to the third-party service provider 108 later re-adding the user, the access module 104 may continue to use the same session identity, and can begin sharing the same data downloaded from the same third-party service provider 108 with the same electronic credentials again, so that continuity is not lost.

Although an access module 104 may allow multiple third-party service providers 108 to share and/or otherwise use the same data, in some embodiments, the multiple third-party service providers 108 may maintain their own, different metadata for the same data. For example, if the multiple third third-party service providers 108 comprise financial institutions, financial technology providers, or the like that are each aggregating a user's financial transaction data from one or more of the same third-party service providers 108 (e.g., other financial institutions or the like), each of the multiple third-party service providers 108 may receive the same financial transaction data for the user, but may maintain separate metadata (e.g., categories for transactions, budgets, financial goals, or the like) for the same data. In some embodiments, different members of a household, family members, or the like may share an account (e.g., a joint financial account or the like) and may each set their own preferences, categories, budgets, financial goals, or the like, which the different third-party service providers 108 may maintain as separate metadata.

An access module 104, in one embodiment, may be configured to clone, duplicate, and/or copy a session identity in response to a user changing and/or updating a password or other electronic credential with one of the third-party service providers 108 that is accessing data for the user from another third-party service provider (e.g., maintaining the original session identity using the previous password and/or other electronic credential and the cloned session identity with the new password). If the access module 104 determines that login is successful using the new password (e.g., that the user's data may be accessed and/or downloaded using the new password), in some embodiments, the access module 104 may prompt the user for the changed password through a GUI of one or more of the other third-party service providers 108 accessing the downloaded data (e.g., in order to obtain the user's permission to use the new password for the other third-party service providers 108), may prompt the user for authorization to use the new password with other third-party service providers 108, or the like. In response to the login using the new password failing or being unsuccessful (e.g., failing to download the user's data using the new password), the access module 104 may prompt the user for the previous password, for authorization to use the previous password, or the like through a GUI of the third-party service provider 108 through which the user provided the new password, may revert from the cloned session identity to the original session identity, or the like.

Figure 2:
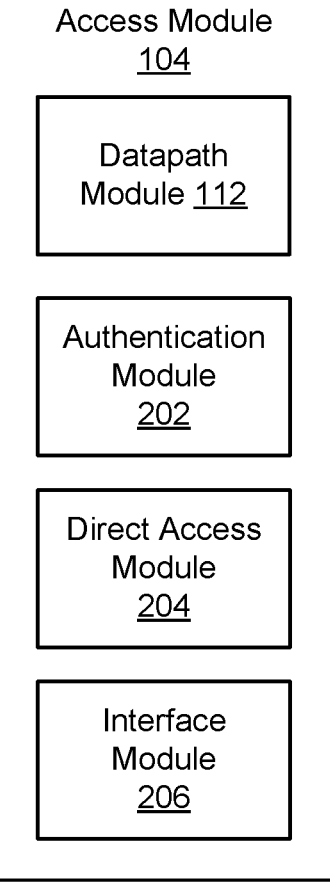
FIG. 2 is a schematic block diagram of one embodiment of an access module.

FIG. 2 depicts one embodiment of an access module 104. In the depicted embodiment, the access module 104 includes a datapath module 112, an authentication module 202, a direct access module 204, and an interface module 206. The datapath module 112, in certain embodiments, may be substantially similar to the datapath module 112 described above with regard to FIG. 1A and FIG. 1B.

In one embodiment, the authentication module 202 receives a user's electronic credentials for a third-party service provider 108, for a core processing system 122a-n, or the like from the user on a hardware computing device 102 of the user. In cooperation with one or more authentication modules 202, the access modules 104, 104, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an access module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware computing device 102 (e.g., encrypting data in RAM, NAND, and/or other general purpose storage) with or without dedicated security hardware.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different third-party service providers 108 (e.g., different social networks, different photo sharing sites, different financial institutions) so that the access module 104 may download, aggregate, and/or combine the user's data from the multiple different third-party service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more third-party service providers 108. For example, in certain embodiments, the authentication module 202 may receive an initial set of electronic credentials (e.g., a username and a password) from a user for an account of the user with a third-party service provider 108, and the authentication module 202 may use the initial set of electronic credentials to access the user's account with the third-party service provider 108 to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more third-party service providers 108, core processing systems 122*a-n*, datapath modules 112, or the like using a user's electronic credentials from the authentication module 202. The direct access module 204, in certain embodiments, downloads data associated with a user (e.g., a user's social media posts, a user's photos, a user's financial transactions or financial account information, or the like) from one or more servers 108 of one or more third-party service providers 108, from one or more core processing systems 122*a-n*, or the like to a hardware computing device 102 of a user and/or to a backend server 110 or other intermediary 110 associated with the direct access module 204, or the like.

In some embodiments, such as if an API or other interface is not available, the direct access module 204 may use a webpage interface of a server 108 of a third-party service provider 108 to access the server 108 using a user's electronic credentials and/or to download data associated with the user. For example, in certain embodiments, the direct access module 204 may download/load a webpage from a server 108 of a third-party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a third-party service provider 108, a core processing system 122*a-n*, or the like with a user's electronic credentials, the direct access module 204 may download data associated with the user (e.g., from a user's account or the like) to a hardware computing device 102 associated with the user, to a backend server 110, or the like. As described below, in certain embodiments, the pattern module 308 may receive and/or provide instructions enabling the direct access module 204 to download data associated with a user from a server 108 of a third-party service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, the direct access module 204 sends or otherwise submits electronic credentials and/or receives or otherwise downloads data using an API or other access protocol of a server 108 and/or core processing system 122*a-n* of a third-party service provider 108. For example, the direct access module 204 may send a request in a format specified by and/or compatible with a server 108 (e.g., an API server 108) and/or a core processing system 122*a-n* of a third-party service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 and/or core processing system 122 for the first request, or the like), and/or the direct access module 204 may use a different access protocol.

In response to a request for data from the direct access module 204 (e.g., in response to the direct access module 204 authenticating a user using an access protocol of a server 108 and/or a core processing system 122), a server 108 and/or a core processing system 122 of a third-party service provider 108 may send and/or return data associated with a user (e.g., in one or more messages, packets, payloads, as a URL or other pointer to a location from where the direct access module 204 may retrieve the data, to the datapath module 112, or the like). The direct access module 204, in various embodiments, may receive data associated with a user directly from a server 108 and/or a core processing system 122 of a third-party service provider 108 over a data network 106; may receive a pointer, URL or other link to a location of data associated with a user from a server 108 and/or core processing system 122 of a third-party service provider 108; may receive data associated with a user from another entity on a data network 106 (e.g., in response to a request from the server 108 and/or core processing system 122 of the third-party service provider 108 to the other entity or the like); or may otherwise receive data associated with a user according to an access protocol of a third-party service provider 108.

In one embodiment, a third-party service provider 108 provides a direct access module 204 with an API or other access protocol. In a further embodiment, a direct access module 204 may act as a wrapper for and/or a plugin or extension of, an application of a third-party service provider 108 (e.g., a mobile application), and the application may have access to an API or other access protocol of the third-party service provider 108. In another embodiment, a direct access module 204 may be configured to use an API or other access protocol in a same manner as an application of a third-party service provider 108 (e.g., a mobile application), or the like.

The direct access module 204, in certain embodiments, may access different third-party service providers 108 in different manners. For example, a first third-party service provider 108 may grant the direct access module 204 with access to an API or other access protocol, while the direct access module 204 may use a web page interface (e.g., screen scraping) to access and download data from a second third-party service provider 108, or the like. In one embodiment, a remote backend server 110 may be associated with a first party service provider 110 (e.g., a vendor and/or provider of an access module 104) and the direct access module 204 may download data associated with a user from both the first party service provider 110 and from one or more third-party service providers 108, aggregating the data together so that the user may access the data in a single interface and/or application. For example, as described below with regard to the interface module 206, the interface module 206 may provide a user access to the user's photos from multiple third-party cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more third-party service providers 108. For example, the direct access module 204 may store a user's downloaded and/or aggregated data on a hardware computing device 102 of the user, on a backend server 110 accessible by the user, or the like. In this manner, in certain embodiments, a user may control and/or access the user's data, even if a third-party service provider 108 closes down or is not available, may use the user's data in any manner desired by the user even if the use is not supported by a third-party service provider 108, or the like.

The direct access module 204, in one embodiment, in addition to and/or instead of downloading data from one or more third-party service providers 108, may upload data to and/or change one or more settings of one or more third-party service providers 108, in response to user input or the like. For example, in embodiments where the data comprises photos, the direct access module 204 may upload a photo from a hardware computing device 102 of the user to one or more third-party service providers 110 (e.g., a downloaded photo that the user has edited on the hardware computing device 102 or the like). In embodiments where the data comprises social media posts or other content, the direct access module 204 may receive input from a user (e.g., a photo, a textual post, one or more emoji, a video, a document or other file, or the like) and upload the received input to one or more third-party service providers 108 (e.g., social media sites or the like). In embodiments where the data comprises financial transactions or other financial data, the direct access module 204 may schedule a bill pay or other payment or funds transfer, remotely deposit a check (e.g., by uploading photos of the front and/or back of the check, or the like), and/or perform another action.

The direct access module 204 may update or change a user's account information with a third-party service provider 108, such as an account type or plan, credit card or other payment information associated with an account, a phone number or address or other contact information associated with an account, a password or other electronic credentials for an account, and/or other account information of a user for a third-party service provider 108. The direct access module 204 may update and/or upload data in a substantially similar manner to that described herein for downloading data (e.g., determining a user's electronic credentials for a third-party service provider 108, accessing a server 108 of the third-party service provider 108, uploading and/or providing data to the third-party service provider 108, or the like).

In one embodiment, the interface module 206 provides a user's data downloaded by the direct access module 204 to another entity, such as an application 114, a hardware computing device 102 of a user associated with the downloaded data, a remote server 110 or other remote device 102 unaffiliated with (e.g., not owned by, operated by, controlled by, or the like) the third-party service provider 108 from which the data was downloaded, or the like. For example, the interface module 206 may provide an API or other interface to provide a user's downloaded and/or aggregated data to an application 114 or other data recipient 114, to a hardware computing device 102 of the user, to a backend access module 104, to a backend server 110, to a different third-party service provider 108, to a different/second hardware computing device 102 of the user, or the like (e.g., with consent and/or authorization from the user, at the user's request, or the like).

In certain embodiments, it may be transparent and/or substantially transparent to a user (e.g., not apparent) which hardware computing device 102, 110 has downloaded data associated with the user. For example, the interface module 206 may provide downloaded data associated with a user from one hardware computing device 102 of the user to another hardware computing device 102 of the user, from a hardware computing device 102 of the user to a backend server 110 (e.g., from which the user may access the data using a web browser, an application, or the like), from a backend server 110 to a hardware computing device 102 of the user, or the like, allowing the user to access the data from a different location than the location to which the data was downloaded.

In certain embodiments, the interface module 206 provides a graphical user interface (GUI) on a hardware computing device 102 of a user (e.g., from an application 114 or the like), and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware computing device 102 to which the data was downloaded, on a different hardware computing device 102 than the hardware computing device 102, 110 to which the data was downloaded, or the like.

For example, in one embodiment, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the interface module 206 may provide a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 108, from different contacts or friends of the user, or the like).

The interface module 206, in certain embodiments, may provide one or more access controls to a user, allowing the user to define which applications 114, devices 102, users, third-party service providers 108, or the like may access which data. For example, the interface module 206 may provide an interface for a user to allow and/or restrict certain applications 114, certain APIs for third-party services, certain plugins or extensions, certain users, certain hardware computing devices 102, and/or one or more other entities to access data downloaded for the user from one or more third-party service providers 108 (e.g., with access controls by third-party service provider 108 or other data source, by data type, by entity requesting access, and/or at another granularity). In this manner, the access module 104, in certain embodiments, may comprise a local repository of aggregated data, which one or more other applications 114, devices 102, and/or services may access and use, with a user's permission.

Figure 3:
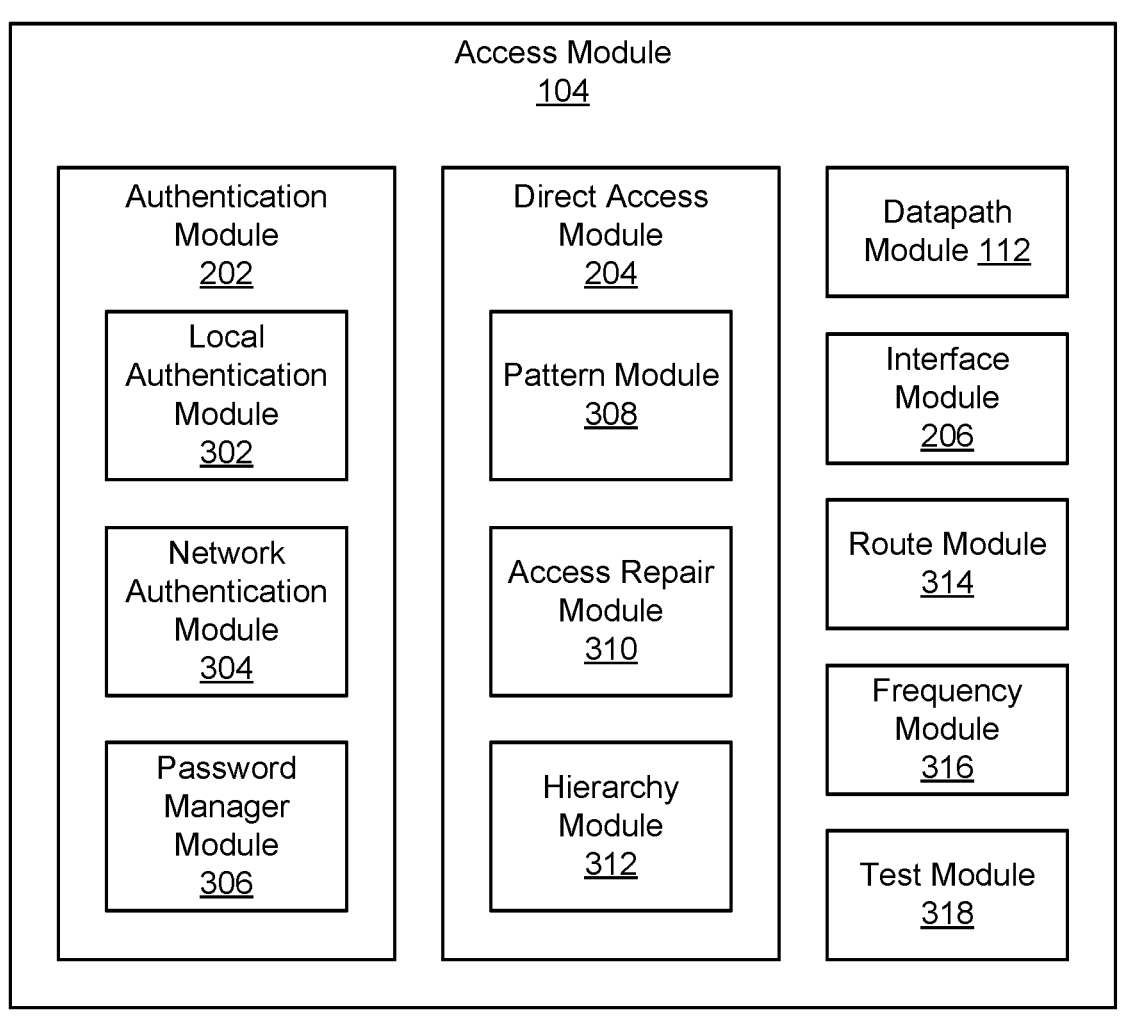
FIG. 3 is a schematic block diagram of another embodiment of an access module.

FIG. 3 depicts another embodiment of an access module 104. In the depicted embodiment, the access module 104 includes a datapath module 112, an authentication module 202, a direct access module 204, and an interface module 206 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware computing device 102, transferred to and/or from a user's hardware computing device 102, or the like. For example, the local authentication module 302 may cooperate with one or more security and/or authentication systems of the user's hardware computing device 102, such as a PIN, password, fingerprint authentication, facial recognition, or other electronic credentials used by the user to gain access to the hardware computing device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the access module 104, for a user, and may authenticate the user in response to the user accessing an application and/or service of the access module 104.

In certain embodiments, the local authentication module 302 may encrypt and/or otherwise secure, on a user's hardware computing device 102, electronic credentials and/or downloaded data associated with a different user, so that the user may not access data associated with the different user, but the different user may access the data once it is transmitted to a hardware computing device 102 of the different user, to a backend server 110, or the like. Local authentication modules 302 of different hardware computing devices 102, 110 may cooperate to securely transfer data (e.g., one or more electronic credentials, downloaded data, or the like) over the data network 106, from one hardware computing device 102, 110 to another hardware computing device 102, 110. In a further embodiment, the local authentication module 302 may ensure that a user's electronic credentials and/or downloaded data remain on a single hardware computing device 102 (e.g., are not transmitted on a data network 106), in a secure repository or the like, and are not stored on and/or accessible to a backend server 110, a hardware computing device 102 of another user, or the like.

In one embodiment, the network authentication module 304 receives and/or stores a user's electronic credentials for one or more third-party service providers 108 on a hardware computing device 102 of the user, on a backend server 110, or the like. The network authentication module 304, in various embodiments, may receive a user's electronic credentials from the user, from a hardware computing device 102 of the user, from a backend server 110, or the like. The network authentication module 304 may cooperate with the direct access module 204 to provide a user's electronic credentials to a server 108 of a third-party service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more third-party service providers 108, on a hardware computing device 102 of a user, on a data network 106, on a hardware computing device 102 of a different user, on a backend server 110, while being provided to a server 108 of a third-party service provider 108, or the like. In a further embodiment, the network authentication module 304 ensures that a user's electronic credentials are only stored on a user's hardware computing device 102 and sent from the user's hardware computing device 102 to a server 108 of a third-party service provider 108, and does not store a user's electronic credentials on a backend server 110, on a different user's hardware computing device 102, or the like. In another embodiment, the network authentication module 304 may securely store (e.g., using secure encryption) a user's electronic credentials for a third-party service provider 108 on a backend server 110, on a different user's hardware computing device 102, or the like, so that a direct access module 204 may access and/or download data associated with the user, even if the hardware computing device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware computing device 102, a backend server 110, or the like may be based on a setting defined based on user input, so that the user may decide a level of security, or the like.

In one embodiment, the password manager module 306 may manage and/or store electronic credentials of a user for a plurality of third-party service providers 108, so that the direct access module 204 may access and/or download data associated with the user from each of the plurality of third-party service providers 108. The password manager module 306, in certain embodiments, may generate and/or otherwise manage different, secure, credentials for each of a plurality of third-party service providers 108.

The password manager module 306, in one embodiment, may securely store generated credentials for a user on a hardware computing device 102 of the user, so that the user does not have to remember and enter the generated electronic credentials. For example, in addition to allowing a direct access module 204 to access a third-party service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third-party service provider 108 with the regenerated different credentials) electronic credentials for a user, such as every week, every month, every two months, every three months, every four months, every five months, every six months, every year, every two years, in response to a user request, in response to a request from a third-party service provider 108, and/or over another time period or in response to another periodic trigger.

The password manager module 306, in one embodiment, may synchronize a user's electronic credentials (e.g., provided by the user, generated by the password manager module 306, or the like) across different hardware computing devices 102, web browsers, or the like of a user. For example, in response to a password manager module 306 and/or the user updating or otherwise changing electronic credentials, the password manager module 306 may propagate the update/change to one or more other password manager modules 306, on different hardware computing devices 102 of the user, or the like.

In one embodiment, the pattern module 308 determines an ordered list (e.g., a pattern, a script, or the like) of multiple locations on one or more servers 108 of a third-party service provider 108 for the direct access module 204 to access the server (e.g., which may include locations other than where the data of the user is stored and/or accessible), one or more delays for the direct access module 204 to wait between accessing locations on the server 108, and/or other components of an access pattern for accessing data of a server. Locations, in certain embodiments, comprise independently addressable and/or accessible content and/or assets provided by one or more servers of a third-party service provider 108, or the like, such as webpages, portions of a webpage, images or other data files, databases or other data stores, pages or sections of a mobile application, or the like. The pattern module 308, in one embodiment, determines a pattern/ordered list that contains one or more locations and/or delays that are not necessary for the direct access module 204 to access or use in order to download desired data, but instead, the pattern/ordered list may make it difficult or impossible for the third-party service provider 108 to distinguish between the direct access module 204 accessing a server of the third-party service provider 108 and a user accessing the server of the third-party service provider.

The pattern module 308, in one embodiment, may determine and/or select the multiple locations and/or the one or more delays (e.g., a pattern/ordered list) based on an average pattern or a combined pattern identified in or based on behavior of multiple users accessing a third-party service provider 108 using a web browser, a mobile application, or the like. The pattern module 308, in one embodiment, may monitor one or more users (e.g., for a predetermined period of time or the like) as they access a server of a third-party service provider 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the direct access module 204 to use to access a server of a third-party service provider 108.

In a further embodiment, the pattern module 308 determines and/or selects multiple locations and/or one or more delays between accessing different locations based on a pattern identified in behavior of the user associated with the hardware computing device 102 on which the pattern module 308 is disposed, accessing the third-party service using a web browser, a mobile or desktop application, or other interface of the user's hardware computing device 102. For example, the pattern module 308 may comprise network hardware of the user's hardware computing device 102 (e.g., a network access card and/or chip, a processor, an FPGA, an ASIC, or the like in communication with the data network 106 to monitor data and/or interactions with a server of a third-party service provider 108), a web browser plugin or extension, a mobile and/or desktop application executing on a processor of the user's hardware computing device 102, or the like. The pattern module 308 may request and receive authorization from the user to monitor the user's activity with regard to one or more servers of one or more third-party service providers 108 from the user's hardware computing device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a third-party service provider 108 and/or data associated with a user becoming broken and/or inaccessible.

In one embodiment, the access repair module 310 detects that access to a server 108 of a third-party service 108 and/or data associated with a user is broken and/or becomes inaccessible. The access repair module 310, in certain embodiments, provides an interface to a user allowing the user to graphically identify an input location for the user's electronic credentials, a location of data associated with the user, or the like. For example, the access repair module 310 may provide a GUI, a command line interface (CLI), an API, and/or another interface allowing an end user to identify an input location for electronic credentials, an action for submitting electronic credentials, a location of data, or the like. The access repair module 310, in one embodiment, provides an interface to a user on a hardware computing device 102 of the user.

In certain embodiments, for example, the access repair module 310 may overlay an interface over one or more pages of a website of a third-party service provider 108 on an electronic display screen of a user's hardware computing device 102, as described in greater detail below with regard to FIGS. 5A-5B. The access repair module 310 may provide one or more interfaces (e.g., GUIs, CLIs, APIs, overlays, or the like) to multiple users, allowing multiple users to define a repair and/or update for access to a server of a third-party service provider 108 (e.g., in a distributed and/or decentralized manner, from different hardware computing devices 102 or the like over a network 106).

The access repair module 310, in certain embodiments, may determine and/or display one or more suggestions 504 and/or recommendations 504 for the user, which the user may either confirm or change/correct (e.g., in a basic interface, a standard interface, a beginning user interface, or the like). For example, the access repair module 310 may display one or more interface elements with a suggested location for a user to enter a user name, a suggested location for a user to enter a password, a suggested credential submit action, a suggested location of data associated with the user, and/or one or more other interface elements allowing a user to graphically identify one or more locations within a website of a third-party service provider 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a website, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like). The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the test module 318 cooperates with the access repair module 310 to verify whether or not one or more received locations and/or instructions from a user are accurate (e.g., usable to access data from a server of a third-party service provider 108). The test module 318, in certain embodiments, attempts to access a server 108 of a third-party service provider 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a third-party service provider 108 using identifications which the access repair module 310 received from different users (e.g., on different hardware computing devices 102 and sent to the test module 318 on a single hardware computing device 102 over the data network 106, sent to multiple test modules 318 on different hardware computing devices 102 over the data network 106, sent to a test module 318 on a central backend server 110, or the like).

The test module 318, in one embodiment, provides one or more identifications from a user to other instances of the direct access module 204 (e.g., other test modules 318) for accessing a server 108 of a third-party service provider 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a third-party service provider 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a third-party service provider 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a third-party service provider 108, as described in greater detail below with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more access modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more access modules 104 and their aggregation services to be self healing, self testing, and/or self incrementally deploying, as it tests and uses the most effective solutions, or the like (e.g., sets of instructions based on indications from one or more users).

In one embodiment, the hierarchy module 312 provides the direct access module 204 with an ordered list of multiple different sets of instructions for accessing a server 108 of a third-party service provider 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend access module 104 of a backend server 110), from another user hardware computing device 102 in a peer-to-peer manner (e.g., an access module 104 of a user hardware computing device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware computing devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware computing devices 102 of the user).

The direct access module 104, in one embodiment, may iterate through an ordered list of multiple sets of instructions for accessing a server 108 of a third-party service provider 108, in the order of the list, until one of the sets of instructions is successful and the direct access module 104 is able to access and/or download data from the third-party service provider 108. The hierarchy module 312, in one embodiment, may place a most recent successfully used set of instructions at the top (e.g., as the first set to try). For example, the hierarchy module 312 for a user's hardware computing device 102 may place a set of instructions for accessing a third-party service provider 108 at the top of a list (e.g., adjusting an order of the list over time) in response to the direct access module 204 successfully accessing and/or downloading data from the third-party service provider 108 using the set of instructions. In certain embodiments, the hierarchy module 312 may receive an ordered list of multiple different sets of instructions for accessing a server 108 of a third-party service provider 108 in a first order (e.g., a global order) and may dynamically adjust and/or rearrange the different sets of instructions over time based on a single user's/hardware computing device 102's use (e.g., moving a set of instructions up in the list if access using the set of instructions is successful for the user/hardware computing device 102, moving a set of instructions down in the list if access using the set of instructions is unsuccessful for the user/hardware computing device 102, or the like).

The hierarchy module 312, in certain embodiments, may be configured to share one or more sets of instructions, an ordered list of multiple sets of instructions, or the like with a hierarchy module 312 of another user's hardware computing device 102 over a data network 106 (e.g., directly to the other user's hardware computing device 102 in a peer-to-peer manner, indirectly by way of a backend access module 104 of a backend server 110, or the like). Different sets of instructions may be successful or unsuccessful for different users, in various embodiments, due to different account types, different account settings, different originating systems (e.g., due to a corporate acquisition or the like, different users of the same third-party service provider 108 may have one or more different settings, different access methods, or the like), system changes or upgrades, and/or another difference in accounts, services, or the like for different users of the same third-party service provider 108.

In one embodiment, the route module 314 determines whether a hardware computing device 102 of a user is available for the direct access module 204 to download data associated with the user from a server 108 of a third-party service provider 108. The route module 314, in certain embodiments, may access a server 108 of a third-party service provider 108, from a remote backend server 110, using the user's electronic credentials, to download data associated with the user from the server 108 to the remote backend server 110 in response to the route module 314 determining that the hardware computing device 102 of the user is unavailable. The route module 314, in one embodiment, provides a user one or more alerts (e.g., downloaded data from a third-party service provider 108, a recommendation or suggestion determined based on data from a third-party service provider 108, a notification or other alert based on an event or other trigger detected in data from a third-party service provider 108, or the like) on a hardware computing device 102 of the user based on the data associated with the user downloaded to the remote backend server 110.

In certain embodiments, the route module 314 maintains and/or stores a list of multiple hardware computing devices 102 associated with a single user and/or account. In response to determining that one hardware computing device 102 associated with a user and/or account is unavailable (e.g., powered down, in airplane mode, not connected to the data network 106, or the like), the route module 314 may access a server 108 of a third-party service provider 108 from a different, available hardware computing device 102 of the user and/or account, may provide one or more notifications or other alerts on a different, available hardware computing device 102, or the like. The route module 314, in various embodiments as described below with regard to FIGS. 4A-4C, may dynamically route downloading of data for a user from a third-party service provider 108 between multiple hardware computing devices, such as one or more hardware computing devices 102 of the user, one or more hardware computing devices 102 of a different user, one or more backend servers 110, and/or another hardware computing device, in a secure manner.

The route module 314, in one embodiment, may alternate or rotate between multiple hardware computing devices 102, 110 (e.g., of the same user, of different users, or the like) for downloading data for the same user from a third-party service provider 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware computing device 102 of a user, a backend server 110, or the like), which may be authorized and/or identified by the third-party service provider 108 as a trusted device, or the like.

In one embodiment, the frequency module 316 sets a frequency with which the direct access module 204 accesses the server 108 of a third-party service provider 108. The frequency module 316, in certain embodiments, determines a frequency based on input from a remote backend server 110, which may be unaffiliated with the third-party service provider 108 being accessed, so that the remote backend server 110 (e.g., the frequency module 316 executing on the remote backend server 110) determines frequencies for a plurality of direct access modules 204 for different users and/or different hardware computing devices 102. For example, the frequency module 316 may limit a single user and/or hardware computing device 102 from accessing the same third-party service provider 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a third-party service provider 108, or the like.

The frequency module 316, in certain embodiments, may dynamically adjust a frequency with which a user and/or hardware computing device 102 may access a third-party service provider 108 over time. For example, the frequency module 316 may monitor access and/or downloads by multiple users (e.g., all users, available users, active users, or the like) to cap or limit a total access and/or download bandwidth for each of the different third-party service providers 108 (e.g., so as not to overwhelm any single third-party service provider 108, or the like). In this manner, in one embodiment, a user and/or hardware computing device 102 may access and/or download data with a higher frequency when fewer other users and/or hardware computing devices 102 are accessing and/or downloading data (e.g., low peak times), but may be limited to a lower cap or access frequency when more other users and/or hardware computing devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more third-party service providers 108 using one or more hardware computing devices 102 (e.g., providing different settings allowing the user to set different access frequencies for different third-party service providers 108, different hardware computing devices 102 of the user, or the like).

Figure 4:
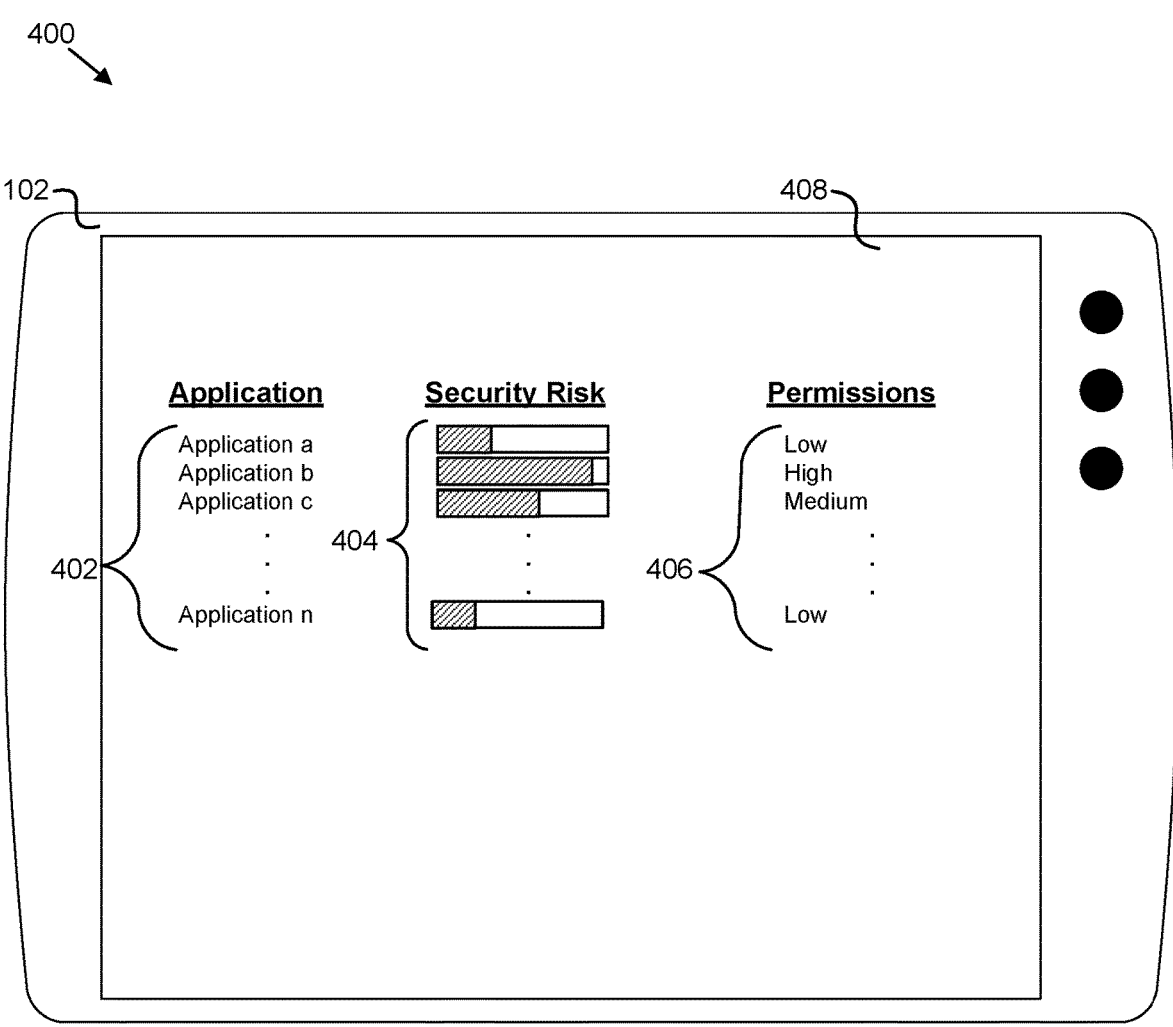
FIG. 4 is a schematic block diagram illustrating one embodiment of a user interface.

FIG. 4 depicts one embodiment of a graphical user interface 400. The GUI 500, in certain embodiments, is provided by an access module 104 to a user on an electronic display screen of a hardware computing device 102, allowing a user (e.g., an administrator or other user associates with a third party data provider 108 providing the data) to dynamically view adjusted scope of permissions for an API of the access module 104, to define and/or adjust access controls, or the like for one or more applications 114 that have or that have requested access to data from an API or other interface of the third party data provider 108 providing the data. In one embodiment, the GUI 400 comprises a web page. In a further embodiment, the GUI 400 comprises a mobile application, a desktop application, and or another graphical user interface displayed on an electronic display screen 408 of a hardware computing device 102. The GUI 400, in certain embodiments, may be embedded within a different GUI of a third-party service provider 108, allowing the user to manage access controls for the third-party service provider 108 directly from within the third-party service provider 108's own GUI.

In the depicted embodiment, an access module 104 displays to a user a listing 402 of a plurality of applications 114 *a-n* or other data recipients. Each listing 402, in further embodiments, may include one or more user interface elements (e.g., checkboxes, a slider, buttons, a dropdown menu, radio buttons, and/or other user interface elements) allowing the user to define access permissions individually for each of the applications 114 *a-n* (e.g., with regard to different portions of the downloaded data such as an account balance; an interest rate; transaction data such as a party to a transaction, a date of a transaction, an amount of a transaction, a category for a transaction, a geographic location of a transaction, or the like; and/or other portions of data; with regard to a number of requests allowed; with regard to a number of users allowed; with regard to a type of data elements allowed; or the like). In other embodiments, a GUI 400 may include a single button or other user interface element to grant or revoke access, one button or other user interface element to grant access and a second button or other user interface element to revoke access, or the like.

In the depicted embodiment, an access module 104 displays to the user indications 404 of determined security risks for each of the applications 114 *a-n* from the listing 402. An access module 104, in the depicted embodiment, also displays, in the GUI 400, a listing 406 of dynamically adjusted scopes of permissions for each of the applications 114 *a-n* in the listing 402. While the listing 406 of the scopes of permissions, in the depicted embodiment, includes categories of permissions for simplicity (e.g., "Low", "Medium", "High") in other embodiments, the listing 406 of the scopes of permissions may be fine grained, listing data elements that are available, limits on types of data elements, allowed numbers of users, allowed frequency of requests, or the like, or a user may touch, click, or provide other user input to view more fine grained information.

Figure 5:
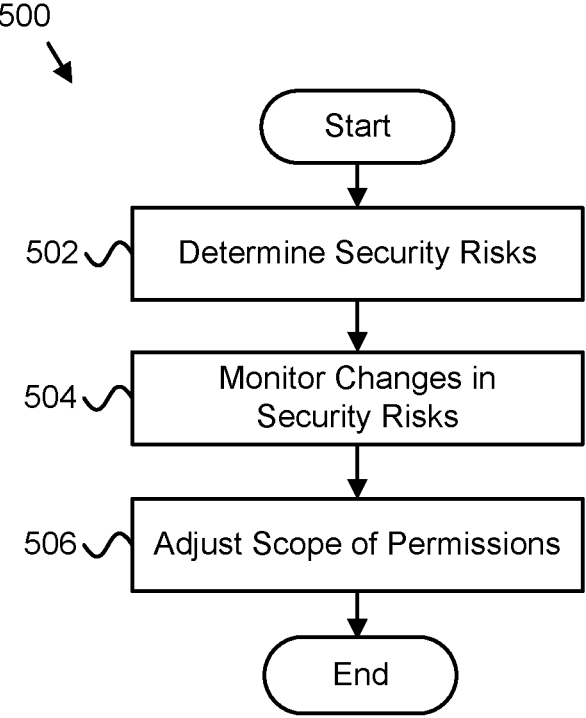
FIG. 5 is a schematic flow chart diagram illustrating one embodiment of a method for risk assessment based data access.

FIG. 5 depicts one embodiment of a method 500 for risk assessment based data access. The method 500 begins and an access module 104 determines 502 security risks for each of a plurality of executable applications 114 accessing an application programming interface 104. An access module 104 monitors 504 changes in the security risks for each of the plurality of executable applications 114. An access module 104 dynamically adjusts 506 a scope of permissions for the plurality of executable applications 114 with regard to the application programming interface 104 based on the monitored changes in the security risks and the method 500 ends.

Figure 6:
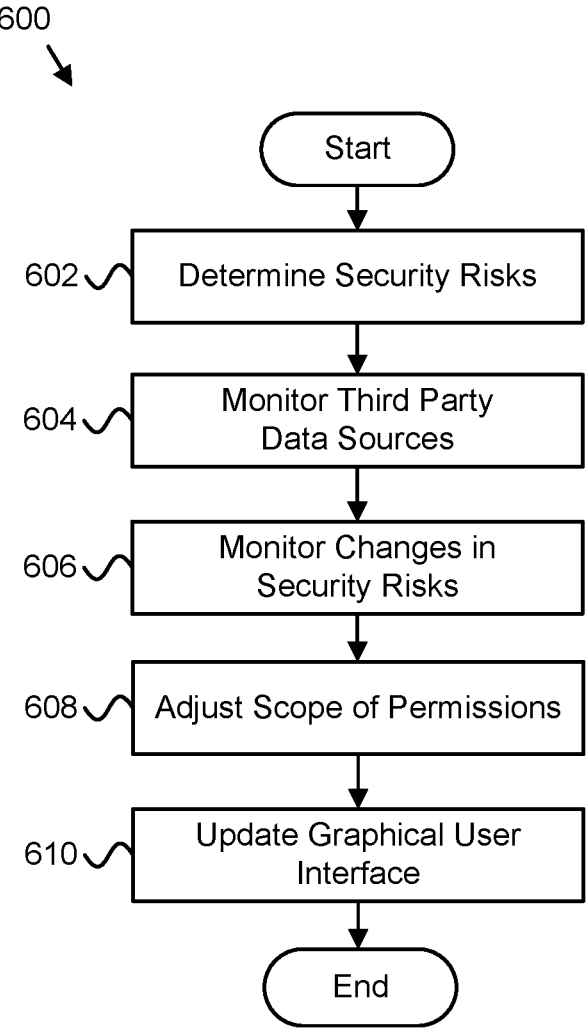
FIG. 6 is a schematic flow chart diagram illustrating a further embodiment of a method for risk assessment based data access.

FIG. 6 depicts one embodiment of a method 600 for risk assessment based data access. The method 600 begins and an access module 104 determines 602 security risks for each of a plurality of executable applications 114 accessing an application programming interface 104. An access module 104 monitors 604 a plurality of third-party computer readable data sources for information associated with the executable applications 114. An access module 104 monitors 606 changes in the security risks for each of the plurality of executable applications 114. An access module 104 dynamically adjusts 608 a scope of permissions for the plurality of executable applications 114 with regard to the application programming interface 104 based on the monitored changes in the security risks. An access module 104 dynamically updates 610 a graphical user interface 400 to display the adjusted scope of permissions for the executable applications 114 on an electronic display screen 408 of a hardware computing device 102 for a user and the method 600 ends.

A means for determining security risks for each of a plurality of executable applications 114 accessing an application programming interface 104, in various embodiments, may include one or more of a hardware computing device 102, 108, 110, a backend server 110, an access module 104, a datapath module 112, a core processing system 122*a-n*, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application 114, and/or other executable code stored on a computer readable storage medium. Other embodiments may include similar or equivalent means for determining security risks for each of a plurality of executable applications 114 accessing an application programming interface 104.

A means for monitoring changes in the security risks for each of the plurality of executable applications 114, in various embodiments, may include one or more of a hardware computing device 102, 108, 110, a backend server 110, an access module 104, a datapath module 112, a core processing system 122*a-n*, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application 114, and/or other executable code stored on a computer readable storage medium. Other embodiments may include similar or equivalent means for monitoring changes in the security risks for each of the plurality of executable applications 114.

A means for dynamically adjusting a scope of permissions for the plurality of executable applications 114 with regard to the application programming interface 104 based on the monitored changes in the security risks, in various embodiments, may include one or more of a hardware computing device 102, 108, 110, a backend server 110, an access module 104, a datapath module 112, a core processing system 122*a-n*, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application 114, and/or other executable code stored on a computer readable storage medium. Other embodiments may include similar or equivalent means for dynamically adjusting a scope of permissions for the plurality of executable applications 114 with regard to the application programming interface 104 based on the monitored changes in the security risks.

A means for monitoring a plurality of third-party computer readable data sources for information associated with the executable applications 114, in various embodiments, may include one or more of a hardware computing device 102, 108, 110, a backend server 110, an access module 104, a datapath module 112, a core processing system 122*a-n*, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application 114, and/or other executable code stored on a computer readable storage medium. Other embodiments may include similar or equivalent means for monitoring a plurality of third-party computer readable data sources for information associated with the executable applications 114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

a processor;

a memory that stores code executable by the processor to:

determine security risks for each of a plurality of executable applications accessing an application programming interface based on a live risk assessment of one or more third parties associated with the plurality of executable applications, wherein the security risks are determined based at least in part on which onboarding steps for the application programming interface have been taken with regard to the plurality of executable applications, the onboarding steps comprising one or more of submissions by the one or more third parties associated with the plurality of executable applications, registration steps, training steps, and interactions with a sandbox environment for the application programming interface;

monitor changes in the security risks for each of the plurality of executable applications, the security risks determined in response to live monitoring third-party computer readable data sources for information associated with the plurality of executable applications and the one or more third parties associated with the plurality of executable applications; and dynamically adjust a scope of permissions for the plurality of executable applications with regard to the application programming interface based on the monitored changes in the security risks.

2. The apparatus of claim 1, wherein the third-party computer readable data sources comprise one or more of government filings, court documents, websites, and information leaked on a dark web.

3. The apparatus of claim 1, wherein the scope of permissions comprises a limit on a number of requests which one of the plurality of executable applications may make to the application programming interface during a predefined period of time.

4. The apparatus of claim 1, wherein the scope of permissions comprises a limit on a number of users for which one of the plurality of executable applications may access the application programming interface.

5. The apparatus of claim 1, wherein the scope of permissions comprises a limit on which data elements one of the plurality of executable applications is permitted to access from the application programming interface.

6. The apparatus of claim 1, wherein the scope of permissions comprises a limit on types of data elements one of the plurality of executable applications is permitted to access from the application programming interface.

7. The apparatus of claim 1, wherein the scope of permissions comprises blocking one of the plurality of executable applications from accessing the application programming interface.

8. The apparatus of claim 1, wherein the code is further executable by the processor to dynamically update a graphical user interface to display the adjusted scope of permissions for the plurality of executable applications on an electronic display screen of a hardware computing device for a user.

9. A method, comprising:

determining security risks for each of a plurality of executable applications accessing an application programming interface based on a live risk assessment of one or more third parties associated with the plurality of executable applications, wherein the security risks are determined based at least in part on which onboarding steps for the application programming interface have been taken with regard to the plurality of executable applications, the onboarding steps comprising one or more of submissions by the one or more third parties associated with the plurality of executable applications, registration steps, training steps, and interactions with a sandbox environment for the application programming interface;

monitoring changes in the security risks for each of the plurality of executable applications, the security risks determined in response to live monitoring third-party computer readable data sources for information associated with the plurality of executable applications and the one or more third parties associated with the plurality of executable applications; and dynamically adjusting a scope of permissions for the plurality of executable applications with regard to the application programming interface based on the monitored changes in the security risks.

10. The method of claim 9, wherein the third-party computer readable data sources comprise one or more of government filings, court documents, websites, and information leaked on a dark web.

11. The method of claim 9, wherein the scope of permissions comprises one or more of a limit on a number of requests which one of the plurality of executable applications may make to the application programming interface during a predefined period of time, a limit on a number of users for which one of the plurality of executable applications may access the application programming interface, a limit on which data elements one of the plurality of executable applications is permitted to access from the application programming interface, a limit on types of data elements one of the plurality of executable applications is permitted to access from the application programming interface, and blocking one of the plurality of executable applications from accessing the application programming interface.

12. The method of claim 9, further comprising dynamically updating a graphical user interface to display the adjusted scope of permissions for the plurality of executable applications on an electronic display screen of a hardware computing device for a user.

13. An apparatus, comprising:

means for determining security risks for each of a plurality of executable applications accessing an application programming interface based on a live risk assessment of one or more third parties associated with the plurality of executable applications, wherein the security risks are determined based at least in part on which onboarding steps for the application programming interface have been taken with regard to the plurality of executable applications, the onboarding steps comprising one or more of submissions by the one or more third parties associated with the plurality of executable applications, registration steps, training steps, and interactions with a sandbox environment for the application programming interface;

means for monitoring changes in the security risks for each of the plurality of executable applications, the security risks determined in response to live monitoring third-party computer readable data sources for information associated with the plurality of executable applications and the one or more third parties associated with the plurality of executable applications; and means for dynamically adjusting a scope of permissions for the plurality of executable applications with regard to the application programming interface based on the monitored changes in the security risks.

14. The apparatus of claim 13, wherein the third-party computer readable data sources comprise one or more of government filings, court documents, websites, and information leaked on a dark web.

15. The apparatus of claim 13, wherein the scope of permissions comprises a limit on a number of requests which one of the plurality of executable applications may make to the application programming interface during a predefined period of time.

16. The apparatus of claim 13, wherein the scope of permissions comprises a limit on a number of users for which one of the plurality of executable applications may access the application programming interface.

17. The apparatus of claim 13, wherein the scope of permissions comprises a limit on which data elements one of the plurality of executable applications is permitted to access from the application programming interface.

18. The apparatus of claim 13, wherein the scope of permissions comprises a limit on types of data elements one of the plurality of executable applications is permitted to access from the application programming interface.

19. The apparatus of claim 13, wherein the scope of permissions comprises blocking one of the plurality of executable applications from accessing the application programming interface.

20. The apparatus of claim 13, further comprising means for dynamically updating a graphical user interface to display the adjusted scope of permissions for the plurality of executable applications on an electronic display screen of a hardware computing device for a user.

\* \* \* \* \*